Jan. 22, 1957  F. R. CHESTER  2,778,376
AUTOMATIC SHUT-OFF VALVE
Filed Aug. 28, 1953

INVENTOR:
Frank R. Chester
BY
N. J. Stevenson

# United States Patent Office 2,778,376
Patented Jan. 22, 1957

2,778,376

AUTOMATIC SHUT-OFF VALVE

Frank Reginald Chester, Santa Monica, Calif.

Application August 28, 1953, Serial No. 377,105

4 Claims. (Cl. 137—268)

This invention relates generally to fluid valves and more particularly to a device connectible in a garden hose or like conduit and operative to control the flow of water through the hose and to supply a lawn-conditioning medium to the water for application to the lawn or garden. Specifically, the invention pertains to a valve-like fitting containing a water-soluble fertilizing material for mixing with the water and having a movable valve plug operative, in response to depletion of the material, to close the valve and thus shut off the flow of water, the device thus being, in effect, a combined time-controlled shut-off valve and dispenser device.

There are many occasions when it is desirable to sprinkle lawns or irrigate gardens but due to other duties on the part of the home owner, away from the home, such watering is sometimes impossible. While a sprinkling or irrigating system may be turned on and left unattended, it frequently occurs that the person may be absent from the home for a considerable length of time or may forget that the system is operating, with the result that excessive water is inadvertently applied to the area. While various time-controlled valves have been developed for use generally in shutting off the flow of fluids through conduits, such proposed valves are complicated and expensive to produce so that their use in connection with a common garden hose or simple irrigating system is prohibitive.

It is therefore an object of this invention to provide a time-controlled valve device which is designed particularly for use in connection with such systems and which is highly practical and efficient in use, and of such simple construction that it can be mass-produced and sold at a very reasonable cost as a hose fitting.

Another object of the invention is to provide a fitting, of the character referred to, which is in the form of a coupling having a hollow, multi-part, separable body or housing, one part of which is connectible to a garden faucet or spigot and another part is connectible to a garden hose, water supplied from the faucet thus flowing through the fitting and hose to a suitable lawn or garden sprinkler.

Another object is to provide a device of the type indicated which embodies means for introducing a lawn- or garden-conditioning material into the water flowing to the sprinkler and for shutting off the water supply when all the material has been dispensed. This object is best attained by providing a ring or annulus of a water-soluble fertilizing material, the material being in the nature of a compressed cake and capable of eroding gradually due to its contact with the water passing through the device. In accordance with the invention, the device has an internal, annular, valve seat within its housing and within the ring of fertilizing material, and a floating valve member supported upon the annular cake, said member having flow passages through which the water passes downwardly through the center of the cake, the member further being provided with a valve washer engageable with the valve seat to shut off the flow of water to the sprinkler.

Another object is to provide a device, of the class referred to, having means embodied therein for creating a swirling action of the water within the annular cake of water-soluble material so as to produce an efficient erosion of the material, this means consisting of an annular bead providing the valve seat, said bead being so located with respect to the flow passages of the valve member that the water is deflected radially and upwardly against the interior of the cake of material with sufficient turbulence to wear away the cake substantially evenly.

As a result of the structure outlined in the above objects, the device functions to supply water to the sprinkler at the rate established by the faucet to which the device is connected. The water in passing through the housing is directed against the interior of the annular compressed cake of water-soluble fertilizer material to erode the same. Thus, particles of the material are taken up by the water and caused to flow to the sprinkler for application to the lawn or garden. As the material is dissolved, the cake is gradually reduced in volume and eventually the cake is completely disintegrated, at which time the valve member descends to a position where its valve washer engages the valve seat to shut off the flow of water to the sprinkler. By this invention, then, the gardener may set a sprinkler in operation in the usual way and then leave it unattended for an indefinite period of time, the present device acting automatically to disrupt the flow of water after a predetermined interval, that is, upon complete erosion of the cake of material.

Further objects of the invention will appear from the following description and from the drawing, which is intended for the purpose of illustration only, and in which.

Figure 1:
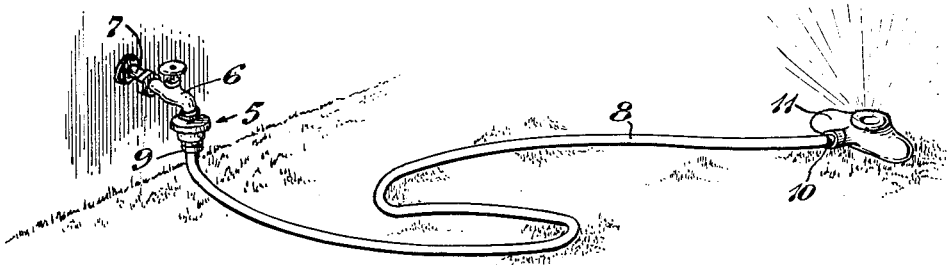
Fig. 1 is a view of a conventional lawn- or garden-sprinkling system including a garden hose, showing my present device applied to use therewith.
Figure 2:
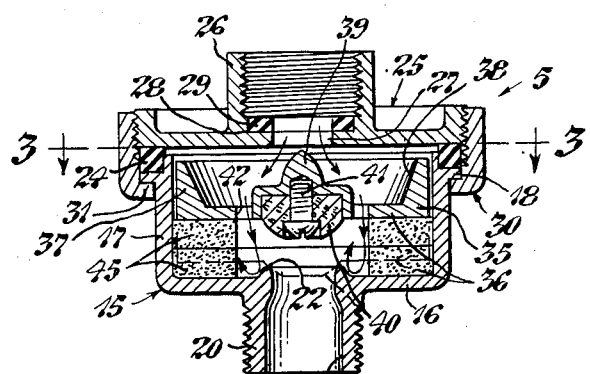
Fig. 2 is a vertical sectional view through the device or fitting.
Figure 3:
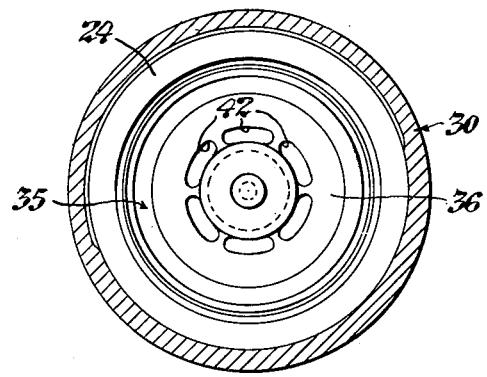
Fig. 3 is a cross-sectional view, taken on line 3—3 of Fig. 2.

Referring to the drawing in detail, the combined automatic shut-off valve and dispenser 5 is shown as connected to a faucet 6 of a water supply line 7. A garden hose 8 has a female coupling element 9 at one end which is screwed onto a neck portion of the device 5. The other end of the hose has the usual threaded male coupling element 10, by which a sprinkler 11 is connected to the hose. When the faucet 6 is opened, the water flows through the fitting 5 and hose 8 to the sprinkler 11 which serves to spray the water onto the area to be irrigated.

The device 5 includes a cup-shaped housing member 15 having a bottom wall 16 and an upstanding cylindrical wall 17. Adjacent its upper end, the wall 17 has a peripheral flange 18 providing an annular shoulder or seat. Projecting downwardly from the center of the bottom wall 16 is an externally threaded boss or neck 20, the neck and bottom wall having a bore 21. Surrounding the bore and projecting above the upper surface of the bottom wall 16 is an annular bead providing a valve seat 22. The shoulder 18 supports a compressible sealing ring 24.

The fitting 5 also includes a disc-like closure member 25 having external screw threads, this member seating upon the sealing ring 24. Projecting upwardly from the central portion of the member 25 is an internally threaded or female coupling portion 26. The boss has a central hole 27 and a counterbore 28 providing an annular shoulder upon which is seated a compressible sealing ring or common hose washer 29.

Surrounding the wall 17 of the housing member 15 is a nut element 30 having internal threads by which it is screwed upwardly onto the threads of the closure member 25. An inwardly directed flange 31 on the nut element 30 engages against the flange 18 and by tightening the element, the closure member 25 is drawn downwardly to compress the sealing ring 24, thus providing a fluid-tight connection.

Arranged for axial sliding movement within the housing member 15 is a valve member 35 which has a bottom wall 36 and an upstanding peripheral wall 37 provided with a tapered inner surface 38. The wall 36 has a central boss 39 which is provided with a recess in its lower portion for receiving a faucet washer 40, a screw 41 passing through the washer and screwed into a threaded hole in the boss, retaining the washer in place. A plurality of flow openings or apertures 42 are provided in the bottom wall 36, closely adjacent the periphery of the boss 39.

The valve member 35 is floatingly mounted within the housing 15 and supported by one or more annular cakes 45 of water-soluble material, capable of being slowly eroded by the water passing downwardly through the fitting. The cakes 45 may be composed of compressed nitrates or other fertilizing and lawn conditioning substances, mild soap, gelatin, etc., adapted to be dissolved by the water and carried thereby through the hose 8 to the sprinkler 11. The consistency or density of the cakes is calculated to be such that they will wear away completely in a predetermined period of time, say thirty or sixty minutes. In addition to containing a fertilizing agent, the cakes may also include an insecticide material.

To apply the device to use, the nut 30 is unscrewed to release the closure member 25 which is then removed to open the top of the housing 15. The valve member 35 is next lifted from the housing, after which the water-soluble rings or cakes 45 are placed in the housing. The valve member is then reinserted in the housing 15 to rest upon the cake or cakes 45. The closure member 25 then is placed on the sealing ring 29, after which the nut element is screwed onto the closure member to complete the assembly.

The upper end 26 of the device is now screwed onto the threaded spout of the faucet 6 to connect the device to the water supply and to compress the sealing washer 29 to provide a leakproof connection. The female coupling 9 of the hose 8 is next screwed onto the neck 20 to connect the sprinkler 11 with the water supply.

After placing the sprinkler at the desired location, the faucet 6 is opened to establish flow of water through the device 5 and hose 8 to the sprinkler 11 which then functions to create the water spray. As the water passes downwardly into the upper portion of the housing 15 and valve member 35, it is directed through the passages 42 into the interior of the water-soluble cakes 45. It is to be particularly noted at this point that the openings 42 serve as nozzles in directing the flow of water toward the annular bead 22 which, due to its shape, diverts the streams of water radially outwardly and upwardly with a swirling action against the inner surfaces of the cakes 45. The turbulent action thus produced creates a force which dislodges minute particles of material from the cakes so as to enhance the erosion or disintegration of the cakes. By this action, the cakes are gradually dissolved and the particles of the lawn- or garden-treating substance are mixed with the water to be applied upon the lawn or soil by the sprinkler.

As previously explained, the masses 45 of treating material are made of such density as to withstand the force of the water for a predetermined period of time. Assuming that the cakes 45 are made to completely erode or disintegrate in an hour, at the end of this period, the valve member 35, which is supported by the cakes, will have descended to a level where its plug or washer 40 engages the annular seat 22. The water pressure, acting against the entire upper surface of the valve member 35, exerts a downward force which maintains the plug 40 firmly seated so as to positively shut off the flow of water from the supply line 7 to the sprinkler 11. Thus, the device functions automatically to discontinue the sprinkling or irrigating operation after a predetermined period of time, as determined by the particular water-soluble material and the size of the cakes employed. The fitting is, therefore, a time-controlled, shut-off valve and dispensing unit.

It is within the concept of the invention to provide a device having a housing of sufficient length to accommodate a plurality of the cakes so as to obtain a wide variation in the period of operation of the sprinkler or other irrigating device. While the device is herein illustrated as composed mainly of die-cast parts, it will be apparent that the various components lend themselves to mass production also as metal stampings or as molded plastic elements.

While the device herein disclosed as embodied in a preferred form of construction and as employing water-soluble rings of specified materials, it will be apparent that various modifications might be made in the structure and materials employed without departing from the spirit or scope of the invention. Consequently, without limiting myself in this respect.

I claim:

1. An automatic shut-off valve for installation in a water supply line, comprising: a housing having an inlet port and an outlet port, and an internal valve seat surrounding said outlet port and having a water deflecting surface; an annular mass of water-soluble material disposed within said housing and surrounding said seat; a valve member slidable within said housing and having an axial, downwardly projecting valve plug, said member having flow passages located radially outwardly of said valve seat and adjacent the internal surface of said annular mass, said plug being engageable with said seat when the member descends within the housing due to erosion of said supporting mass caused by the passage of water through said housing and said annular mass, the water being deflected by said surface with a swirling action and producing turbulence within the interior of said mass.

2. An automatic shut-off valve for installation in a water supply line, comprising: a housing connectible in the line and through which water may flow, said housing having a convex bead providing an annular, raised valve seat therein; a valve member slidable within said housing and having valve plug means engageable with said seat to shut off the flow of water through the housing; and an annular mass of water-soluble material disposed within said housing and surrounding said seat, said mass supporting said valve member and normally withholding the member from engagement with said seat, erosion of said mass by the water flowing through the housing and through the mass allowing movement of said valve member into engagement with said seat, said mass being partly in the plane of said seat and directly exposed to the water impinging against the seat.

3. An automatic shut-off valve for installation in a water supply line, comprising: a multi-part housing connectible in the line and through which water may flow, said housing having a convex bead providing an annular, raised valve seat therein; a valve member slidable within said housing and having valve plug means engageable with said seat to shut off the flow of water through the housing; and an annular mass of water-soluble material disposed within said housing and surrounding said seat, said mass supporting said valve member and normally withholding the member from engagement with said seat, erosion of said mass by the water flowing through the housing and through the mass allowing movement of said valve member into engagement with said seat, said mass being partly in the plane of said seat and directly exposed to the water impinging against the seat.

4. An automatic shut-off valve for use in connection with a water supply faucet and a garden hose, comprising: a cup-shaped housing having a depending externally threaded neck portion connectible to a hose and having an axial outlet port communicating with the interior of the housing, said housing having a raised, internal annular valve seat surrounding said port and providing a water deflector bead, said housing also having a peripheral flange adjacent its upper open end; a sealing ring supported by said flange; an externally threaded closure member closing the upper open end of the housing and engaging said sealing ring, said closure member having a threaded inlet port for connection to the faucet and communicating with the interior of said housing; a nut element surrounding said housing and screwed onto said closure member and having an inwardly directed flange engaging said flange of said housing so as to draw said closure member firmly against said sealing ring; a valve member slidable within said housing and having valve plug means engageable with said seat to shut off the flow of water through the housing; and an annular mass of water-soluble material disposed within said housing and surrounding said seat, said mass supporting said valve member and normally withholding the member from engagement with said seat, erosion of said mass by the water flowing through the housing and through the mass allowing movement of said valve member into engagement with said seat, said mass being partly in the plane of said seat and directly exposed to the water impinging against the seat.

References Cited in the file of this patent

UNITED STATES PATENTS

| | | |
|---|---|---|
| 2,292,801 | Slidell | Aug. 11, 1942 |
| 2,536,428 | Dimitri | Jan. 2, 1951 |
| 2,678,055 | Heim | May 11, 1954 |

FOREIGN PATENTS

| | | |
|---|---|---|
| 685,154 | France | Mar. 25, 1930 |